United States Patent
Beauchamp et al.

(10) Patent No.: US 10,673,678 B1
(45) Date of Patent: Jun. 2, 2020

(54) SCSI TARGET RE-ENTRANT PROTOCOL

(71) Applicant: EMC IP Holding Company LLC, Hopkinton, MA (US)

(72) Inventors: Chris Beauchamp, Los Gatos, CA (US); Shobhan Chinnam, Cupertino, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 227 days.

(21) Appl. No.: 15/650,647

(22) Filed: Jul. 14, 2017

(51) Int. Cl.
| | |
|---|---|
| *G06F 3/06* | (2006.01) |
| *H04L 29/06* | (2006.01) |
| *H04L 29/08* | (2006.01) |
| *G06F 16/176* | (2019.01) |
| *G06F 13/42* | (2006.01) |

(52) U.S. Cl.
CPC .......... *H04L 29/06* (2013.01); *G06F 16/1774* (2019.01); *H04L 67/1095* (2013.01); *G06F 13/4221* (2013.01); *H04L 29/08009* (2013.01)

(58) Field of Classification Search
CPC .. G06F 16/1744; G06F 9/45558; G06F 3/067; G06F 3/0659; G06F 3/0679; G06F 2213/0026; G06F 3/064; Y10S 707/99938; H04L 67/1097; H04L 67/42; H04L 69/14; H04L 67/1095
See application file for complete search history.

(56) References Cited

U.S. PATENT DOCUMENTS

| | | | | |
|---|---|---|---|---|
| 8,706,976 | B2 * | 4/2014 | Kottomtharayil | G06F 3/0619 707/639 |
| 8,850,126 | B2 * | 9/2014 | Prabhu | G06F 9/526 711/141 |
| 9,430,412 | B2 * | 8/2016 | Huang | G06F 13/4221 |
| 10,038,968 | B2 * | 7/2018 | Milton | G06Q 30/0269 |
| 2011/0179082 | A1 * | 7/2011 | Vaghani | G06F 16/1774 707/781 |
| 2018/0024778 | A1 * | 1/2018 | Singh | G06F 3/0604 711/103 |

* cited by examiner

*Primary Examiner* — Chirag R Patel
(74) *Attorney, Agent, or Firm* — Womble Bond Dickinson (US) LLP (57) ABSTRACT

One embodiment is related to a method for implementing a reentrant Small Computer System Interface (SCSI) target, comprising: associating each configuration operation for the SCSI target with a namespace identifier; for each namespace identifier, applying a lock preventing simultaneous execution to configuration operations associated with the same namespace identifier; and permitting simultaneous execution in parallel of configuration operations associated with different namespace identifiers.

15 Claims, 5 Drawing Sheets

SCSI TARGET RE-ENTRANT PROTOCOL

FIELD OF THE INVENTION

Embodiments of the disclosure are related to electronic devices, and more particularly, to an improved SCSI target in a data deduplication backup system.

BACKGROUND

A backup appliance, such as the Data Domain Restorer (DDR) made by EMC Dell, allows data to be written to de-duplicated storage from different backup clients using different protocols such as Network File System (NFS), Common Internet File System (CIFS), Data Domain Boost over Fibre Channel (DFC), Virtual Tape Library (VTL), or Virtual Disk (VDISK). The primary data ingest mechanisms into backup appliance are Ethernet and Fibre Channel. The backup appliance can provide de-duplication for the customer across the different backups, so it is essential for the customer to be able to do backups using different protocols to the same backup appliance to cater to different backup use cases.

In a conventional datacenter environment, different backup clients are managed by different administrators and they choose to configure the backup appliance independently for their needs. These backup clients could use different protocols or different sets of devices. The conventional SCSI target subsystem uses a global locking scheme for configuring Small Computer System Interface (SCSI) devices. This means that configuration of SCSI devices can affect input/output (I/O) of other SCSI devices and can even cause the other SCSI devices to be blocked, disrupting I/O access to other SCSI devices. In other words, conventional SCSI targets allow the devices to be managed as one group, so only one client can manage the devices required by that client even if it is configuring only a subset of devices. The restriction that only one client is allowed to configure and manage the devices at a time leads to increased maintenance windows. In other words, this may negatively impact deployment and configuration time in an enterprise environment.

In addition, in certain scenarios the backup appliance can be slowed down by events such as garbage collection, low free storage space, slow disk, etc. As a result, the devices can respond slowly or become unresponsive leading the backup clients to reset the devices. For example, a backup WRITE could be slow because the backup appliance is nearly full, leading to device resets, but another backup client only performing READs will also get affected. The device reset is a heavy-handed process requiring total control of the devices. In certain scenarios if a subset of devices are performing slowly, a target reset from a backup could affect all the devices on the target, leading to failed backups on all the clients, which can become unacceptable in enterprise datacenters requiring 24/7 availability.

Furthermore, different protocols have different performance requirements, but conventional SCSI targets provide similar performance to all the protocols. Customers expect similar performance from all the devices, but there could be scenarios where some devices starve other devices, causing them to respond slowly and resulting in failed backups. For example, DFC, which utilizes source deduplication, has very little traffic on the wire compared to VDISK. As a result, a fast DFC client can consume all the resources on the target and starve the VDISK devices, leading to backup failures.

Moreover, the device recovery timeouts vary vastly among protocols: VDISK and DFC clients are very sensitive to latency compared to VTL clients. So slow VTL can wreak havoc on backups on VDISK and DFC clients. The nature of the protocols also varies: VTL is a sequential protocol requiring strict adherence to ordering of commands, unlike VDISK and DFC protocols. The protocols also have different performance needs requiring different amounts of resources that cannot be provided by the conventional SCSI target.

The problem is aggravated in the Software Defined Data Centers (SDDCs) where the configuration and management is driven by applications and not handled manually by the users. The applications would like to automate the backup workflows in parallel for different use cases, but with the conventional SCSI target, all requests would get serialized at the backup appliance, leading to reduced productivity for the clients. Clients of backup appliances may not be able to realize the full benefits of the automation provided in the SDDC environment when using a conventional SCSI target.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

The conventional SCSI target limits the configuration access to the SCSI target to only one client, even if the client needs to access only a subset of the devices on the target. This restriction has many drawbacks, especially in a backup appliance in an enterprise environment. Furthermore, the conventional SCSI target recovery can get complicated when client configuration, unresponsive devices and fast client scenarios all happen at the same time.

Hence, embodiments of the invention relate to a method, apparatus, and system for implementing a reentrant SCSI target that separates namespaces for the devices, clients, and/or access protocols. In one embodiment, different protocols (e.g., VTL, VDISK, or DFC) can be configured simultaneously and independently of each other on the same or different SCSI targets, irrespective of the transport protocols (e.g., FC or Internet SCSI "iSCSI") used. The devices using one protocol can operate independently of devices using other protocols in the aspects of configuration, SCSI command processing, session handling, and task management.

In particular, configuration may involve adding, deleting, or modifying SCSI devices. I/O access to devices not associated with the protocol being configured or subjected to task management is unaffected. Therefore, each protocol may be enabled to operate in separate namespaces, and better integration into SDDC may become possible. In one embodiment, the underlying mechanism that enables the autonomy of SCSI devices is a per protocol (e.g., VTL, DFC, or VDISK) array of locking data structures. Every configuration operation may be tagged with a protocol type (i.e., VTL, DFC, or VDISK). When the configuration operation is executed, it affects only devices associated with the protocol, enabling other unassociated SCSI devices (i.e., devices using other protocols) to continue operating autonomously.

In different embodiments, the subset locking mechanism could be applied at different levels of granularity. For example, it can be applied to a set of devices in a SCSI access group that are not shared across other groups. This will benefit multi-tenant use cases, where a backup appliance can have multiple clients with each client having an exclusive ownership of a group of devices that are accessible by only that client.

Figure 1:
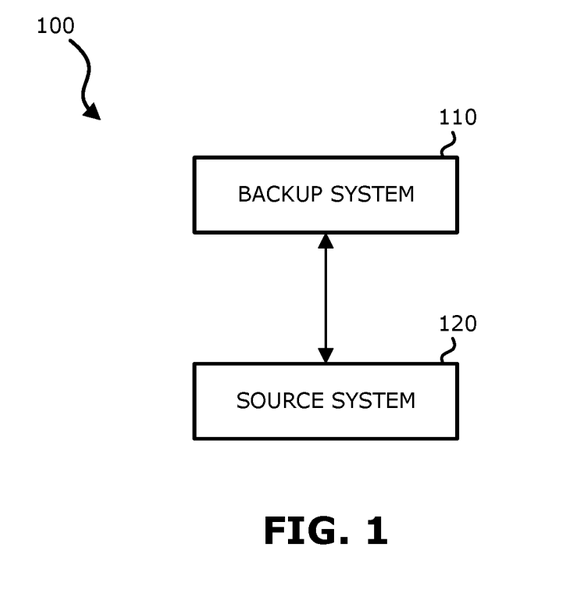
FIG. 1 is a block diagram illustrating an example environment in which embodiments of the invention may be practiced.

Referring to FIG. 1, a block diagram illustrating an example environment 100 in which embodiments of the invention may be practiced is shown. The environment 100 comprises a backup system 110 and a source system 120. The backup system 100 may be a backup appliance, such as the DDR made by Dell EMC. The source system 120 may be a backup client. The backup system 110 and the source system 120 are connected via a suitable data connection. From time to time or periodically, data and metadata from the source system 120 may be copied ("backed up") to the backup system 110 for safekeeping. It should be appreciated that the backup system 110 may not be limited to a single piece of hardware and may comprise any suitable combination of hardware and software to perform its functions. To reduce data traffic and/or save storage space at the backup system 110, the technique of incremental backup may be used. Further, the backup system 110 may perform deduplication on the backups stored thereon. In other words, an object that is present in more than one backups is nonetheless stored only once, and the single copy of the object may be referenced by the backups in which the object is present. In another embodiment, deduplication may be performed at the source system 120 when a new backup is performed, such as when the DFC protocol is utilized. It should be further appreciated that the backup system 110 may serve additional source systems, and the number of source systems does not limit the invention.

Figure 2:
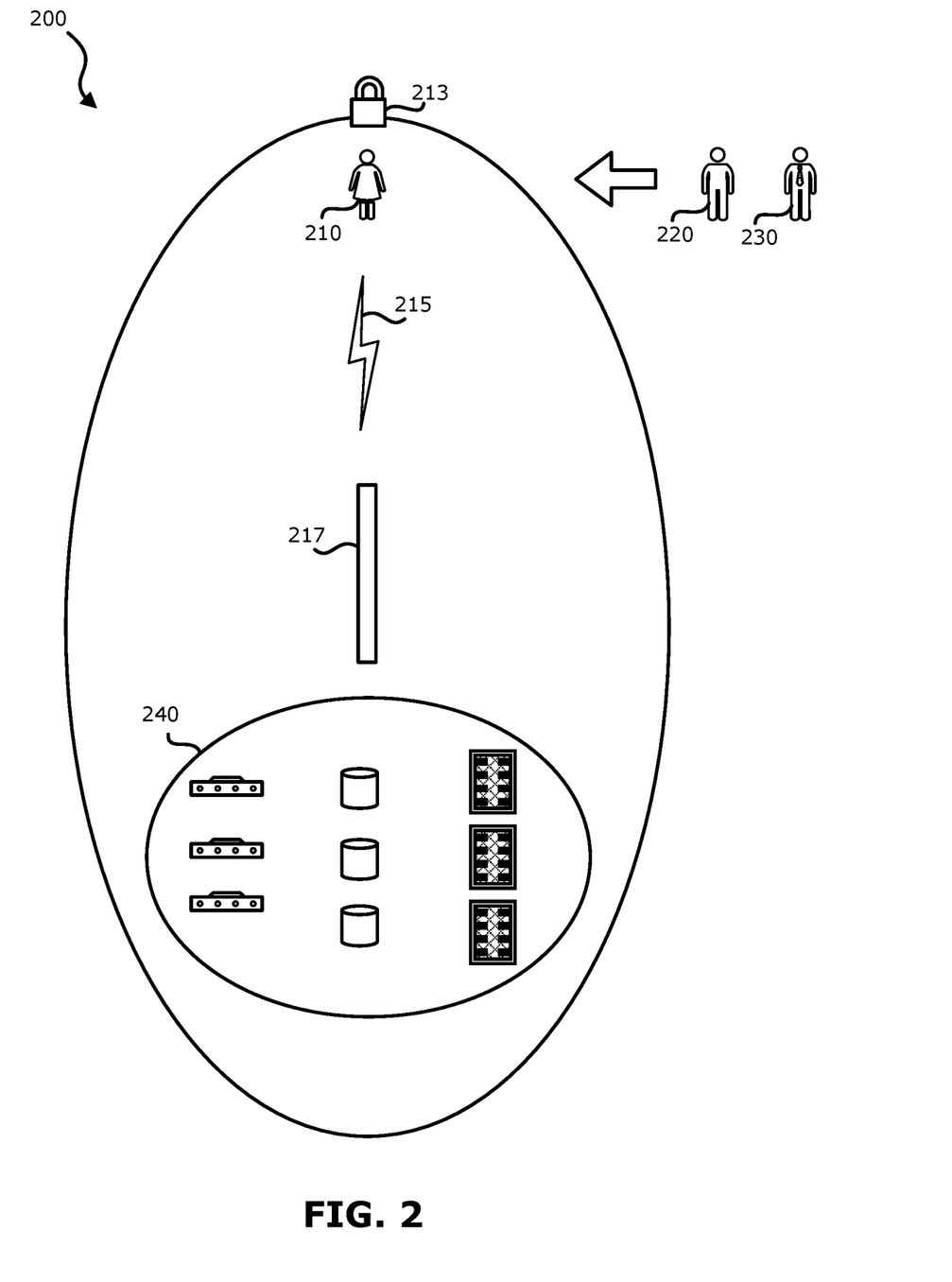
FIG. 2 is a diagram illustrating an example implementation of a conventional SCIS target.

Referring to FIG. 2, a diagram illustrating an example implementation of a conventional SCIS target 200 is shown. In the conventional SCSI target 200, a single lock 213, a single thread 215, and a single queue 217 are used to manage all devices in the group 240 of devices. This leads to serialization of the client operations even when multiple clients want to configure different devices within the group 240 at the same time. For example, as illustrated in FIG. 2, the lock 213 is applied to the whole group 240 of devices while the client 210 is configuring one or more devices within the group 240, even if the client 210 is configuring only a subset of the devices within the group 240. Other clients 220, 230 may wish to configure other devices within the group 240 at the same time, but they cannot because of the single locking mechanism, irrespective of the fact that the devices that clients 220, 230 wish to configure are different from devices being configured by the client 210. Only after the client 210 has completed its configuration and released the lock 213 can one of the clients 220, 230 begin its configuration operation, while the other has to continue waiting.

In some scenarios, the serialization of the client operations with a conventional SCSI target 200 may result in significant performance degradations. For example, a backup client trying to recover slow responding devices with a reset may hold the lock on the resources and may not release the lock till the recovery is completed. If the devices take a long time to recover, the responsiveness of other devices gets impacted, which can lead to abort storms and potentially backup failures of the backup clients.

Further, with the conventional SCSI target 200, only a single thread and a queue of a fixed size are available to the active client. However, different backups may have different needs in terms of performance and resource consumption from the SCSI target. For example, VTL backups are mostly weekly incremental backups and are not performance intensive, whereas VDISK and DFC backups are mostly used for daily incremental backups and change block tracking, which require quick response time to reduce the impact on the production environment. If all the backups are treated the same, as is the case with the conventional SCSI target 200, the service-level agreements (SLAs) for the client backups may have difficulty being met as the performance needs vary between backups.

Figure 3:
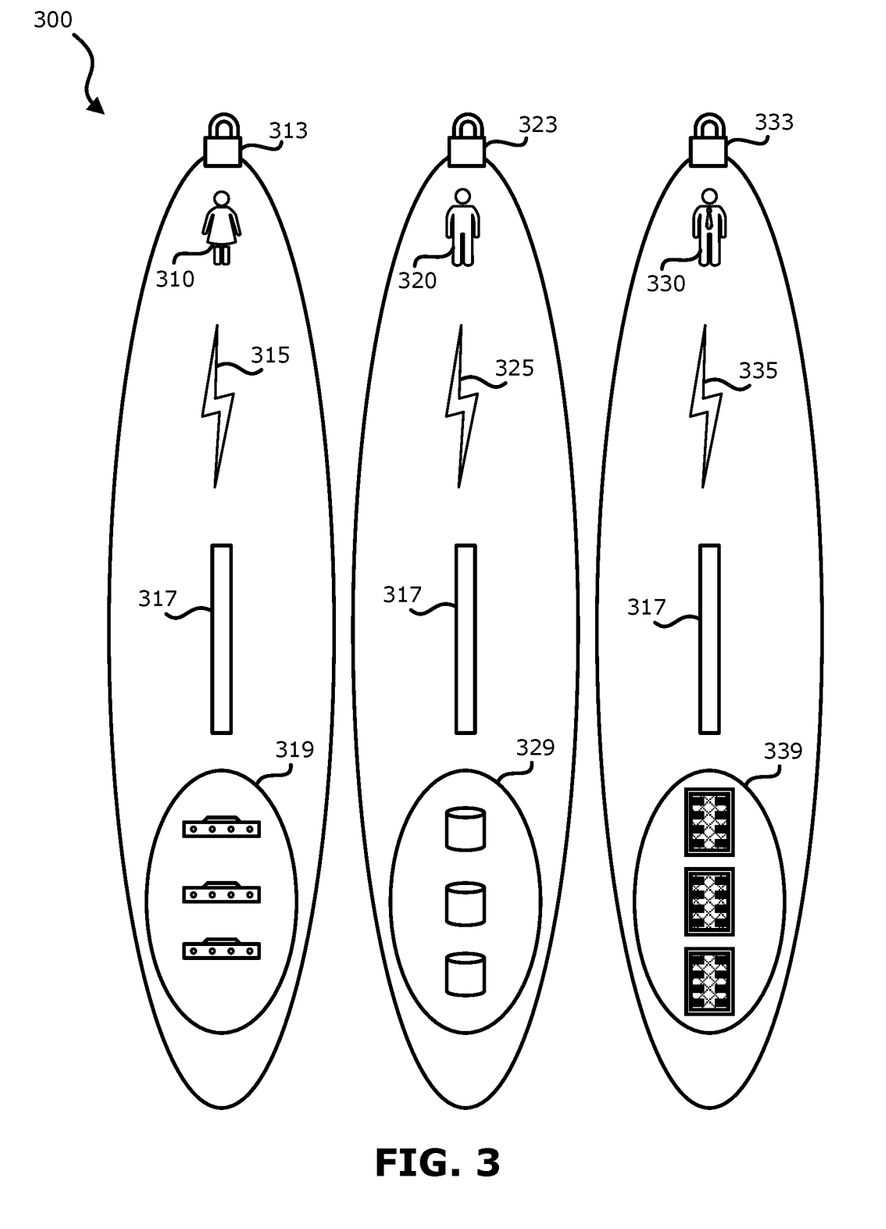
FIG. 3 is a diagram illustrating an example implementation of a reentrant SCSI target.

Referring to FIG. 3, a diagram illustrating an example implementation of a reentrant SCIS target 300 is shown. Three clients 310, 320, 330 wish to configure three separate subsets 319, 329, 339 of devices. Each client 310, 320, 330 uses a different access protocol than the other clients. In this example, client 310 uses VTL, client 320 VDISK, and client 330 DFC. Therefore, the configuration operations generated by the clients 310, 320, 330 may be each tagged with the protocol used, and the locks 313, 323, 333 are protocol-specific. In other words, lock 313 may be applied only to VTL operations on the VTL subset 319 of devices. Similarly, lock 323 may be applied only to VDISK operations on the VDISK subset 329 of the devices, and lock 333 may be applied only to DFC operations on the DFC subset 329 of the devices. Additionally, each protocol may have its own thread and queue: thread 315 and queue 317 for VTL, thread 325 and queue 327 for VDISK, and thread 335 and queue 337 for DFC. Because the locks 313, 323, 333 are protocol-specific, clients 310, 320, 330 may configure their own subsets of devices, respectively, independently from each other and at the same time. Because different clients managing different protocols can configure their operations in parallel, the maintenance time windows and disruption to the backups on other devices can both be reduced.

Accordingly, with the reentrant SCSI target 300, recovery by one client and backup by another client can proceed in parallel at the same time, allowing clients to accomplish configuration and management activities independently of each other.

Further, in one embodiment, as configuration operations under the same lock (e.g., the same client/protocol) have their own thread and their own queue, different protocols (clients) can be associated with different numbers of threads and different queue sizes to better accommodate their performance requirements. This allows the backup appliance to scale to a large number of devices and, at the same time, allows client SLAs to be met even during a slow response time experienced by certain devices due to e.g., garbage collection, device configuration, or low free storage space scenarios.

In another embodiment, configuration operations may be each tagged with a device subgroup identifier, instead of an access protocol. Separate locks may be applied to the configuration operations based on the tagged device subgroup identifier, even if the devices in different subgroups use the same protocol. Therefore, configuration operations are isolated based on the device subgroup identifier. In other words, configuration operations with different device subgroup identifiers may proceed in parallel without interference from each other. This provides the client with the flexibility of a great level of control of the devices in terms of backups, configuration and maintenance for multi-tenant use cases.

Figure 4:
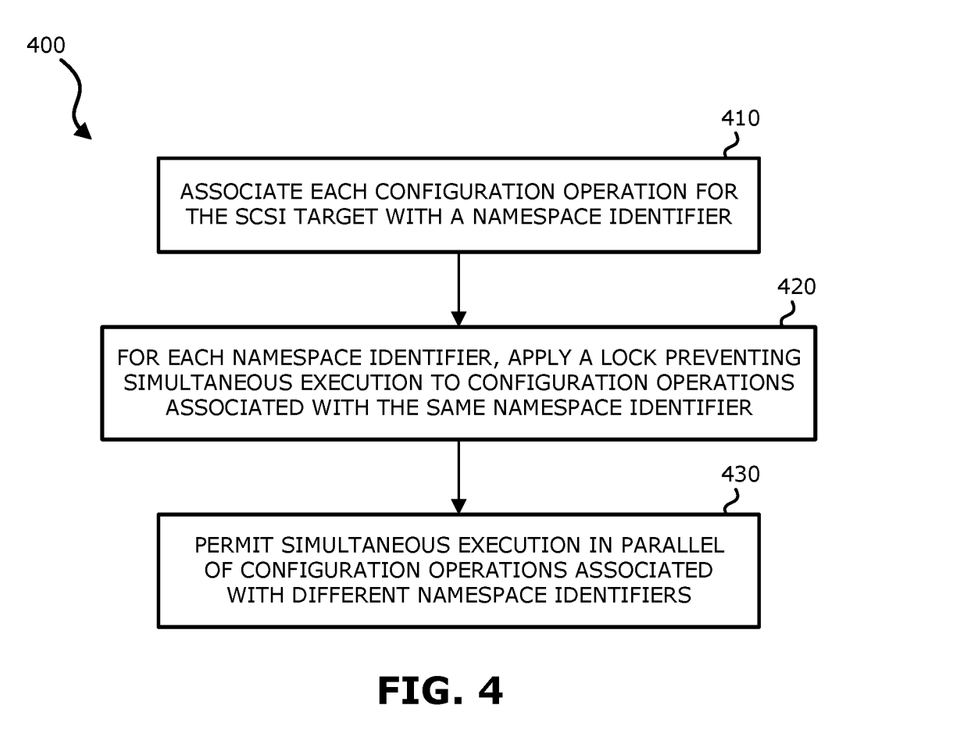
FIG. 4 is a flowchart illustrating an example method for implementing a reentrant SCSI target.

Referring to FIG. 4, a flowchart illustrating an example method 400 for implementing a reentrant SCSI target is shown. At block 410, each configuration operation for the SCSI target may be associated with a namespace identifier. A configuration operation may comprise at least one of: adding, deleting, or modifying on a SCSI device. The namespace identifier may comprise a protocol (e.g., VTL, VDISK, or DFC, etc.) and/or a device subgroup identifier, and may be associated with a client. At block 420, for each same namespace identifier, a lock preventing simultaneous execution may be applied to configuration operations associated with the same namespace identifier. Configuration operations associated with the same namespace identifier may be associated with their own one or more threads and their own queue. At block 430, simultaneous execution in parallel of configuration operations associated with different namespace identifiers may be permitted.

Method 400 may be performed by processing logic that includes hardware (e.g. circuitry, dedicated logic, etc.), software (e.g., embodied on a non-transitory computer readable medium), or a combination thereof. For example, method 400 may be performed by processors 1501 of FIG. 5. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, embodiments of the invention are related namespace-tagged SCSI configuration operations and namespace-specific locking schemes. The namespace may comprise a protocol and/or a device subgroup identifier. The locking mechanism is applied per namespace and configuration operations tagged with different namespace identifiers are permitted to be executed in parallel at the same time. As the clients may be associated with different protocols and/or device subgroup identifiers, embodiments described herein allow them to operate in parallel and cause minimum disruption to each other. In other words, embodiments of the invention may enable the clients to obtain the best backup experience to de-duplication storage. Further, embodiments of the invention enable SDDC and multi-tenant storage appliances to rapidly deploy, operate, and configure any type of virtual SCSI device.

Figure 5:
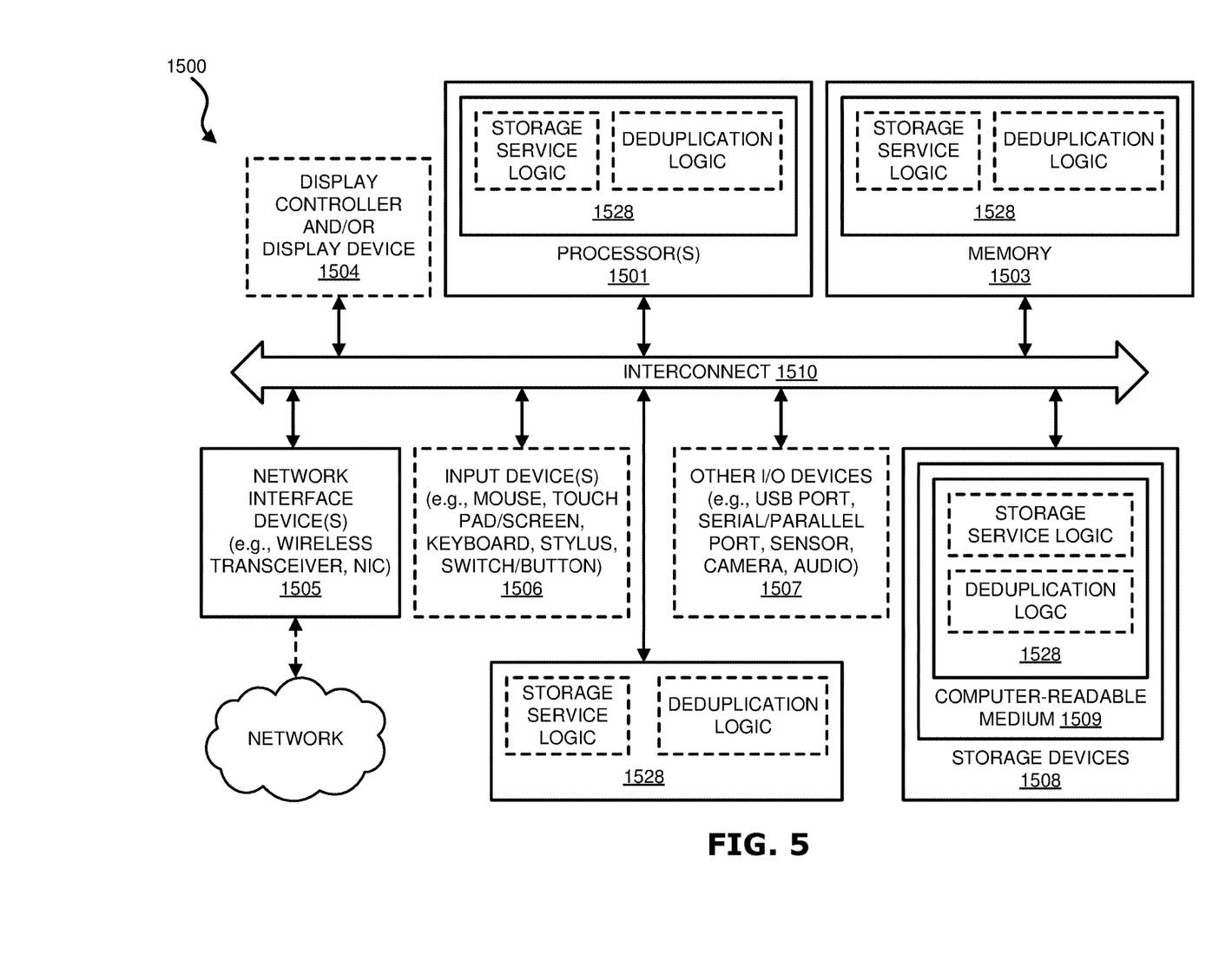
FIG. 5 is a block diagram illustrating an example of a data processing system which may be used with one embodiment of the disclosure.

FIG. 5 is a block diagram illustrating an example of a data processing system 1500 which may be used with one embodiment of the disclosure. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for implementing a reentrant Small Computer System Interface (SCSI) target, comprising:
    associating each configuration operation for the SCSI target with a namespace identifier;
    for each namespace identifier, applying a lock preventing simultaneous execution to configuration operations associated with the same namespace identifier; and
    permitting simultaneous execution in parallel of configuration operations associated with different namespace identifiers,
wherein each namespace identifier comprises a protocol, wherein the protocol is one of, Virtual Tape Library (VTL), Virtual Disk (VDISK), or Data Domain Boost over Fibre Channel (DFC), and wherein simultaneous execution in parallel of configuration operations on devices at the SCSI target that are associated with a same protocol is not permitted, and simultaneous execution in parallel of configuration operations on devices at the SCSI target that are associated with different protocols is permitted.

2. The method of claim 1, wherein each configuration operation comprises at least one or: adding, deleting, or modifying on a SCSI device.

3. The method of claim 1, wherein each namespace identifier comprises a device subgroup identifier.

4. The method of claim 1, wherein configuration operations associated with the same namespace identifier are associated with their own one or more threads and their own queue.

5. The method of claim 1, wherein each namespace identifier is associated with a client.

6. A non-transitory machine-readable medium having instructions stored therein which, when executed by a processor, cause the processor to perform storage operations, the operations comprising:
    associating each configuration operation for the SCSI target with a namespace identifier;
    for each namespace identifier, applying a lock preventing simultaneous execution to configuration operations associated with the same namespace identifier; and
    permitting simultaneous execution in parallel of configuration operations associated with different namespace identifiers,
wherein each namespace identifier comprises a protocol, wherein the protocol is one of: Virtual Tape Library (VTL), Virtual Disk (VDISK), or Data Domain Boost over Fibre Channel (DFC), and wherein simultaneous execution in parallel of configuration operations on devices at the SCSI target that are associated with a same protocol is not permitted, and simultaneous execution in parallel of configuration operations on devices at the SCSI target that are associated with different protocols is permitted.

7. The non-transitory machine-readable medium of claim 6, wherein each configuration operation comprises at least one or: adding, deleting, or modifying on a SCSI device.

8. The non-transitory machine-readable medium of claim 6, wherein each namespace identifier comprises a device subgroup identifier.

9. The non-transitory machine-readable medium of claim 6, wherein configuration operations associated with the same namespace identifier are associated with their own one or more threads and their own queue.

10. The non-transitory machine-readable medium of claim 6, wherein each namespace identifier is associated with a client.

11. A data processing system, comprising:
    a processor; and
    a memory coupled to the processor storing instructions which, when executed by the processor, cause the processor to perform storage operations, the operations including
        associating each configuration operation for the SCSI target with a namespace identifier;
        for each namespace identifier, applying a lock preventing simultaneous execution to configuration operations associated with the same namespace identifier; and
        permitting simultaneous execution in parallel of configuration operations associated with different namespace identifiers,
wherein each namespace identifier comprises a protocol, wherein the protocol is one of: Virtual Tape Library (VTL), Virtual Disk (VDISK), or Data Domain Boost over Fibre Channel (DFC), and wherein simultaneous execution in parallel of configuration operations on devices at the SCSI target that are associated with a same protocol is not permitted, and simultaneous execution in parallel of configuration operations on devices at the SCSI target that are associated with different protocols is permitted.

12. The data processing system of claim 11, wherein each configuration operation comprises at least one or: adding, deleting, or modifying on a SCSI device.

13. The data processing system of claim 11, wherein each namespace identifier comprises a device subgroup identifier.

14. The data processing system of claim 11, wherein configuration operations associated with the same namespace identifier are associated with their own one or more threads and their own queue.

15. The data processing system of claim 11, wherein each namespace identifier is associated with a client.

\* \* \* \* \*